N. Warlick,
Harness Hook,
Nº 15,993.   Patented Oct. 28, 1856.
Fig: 1.
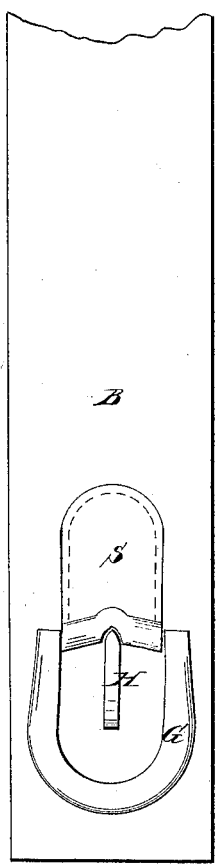
Fig: 2.
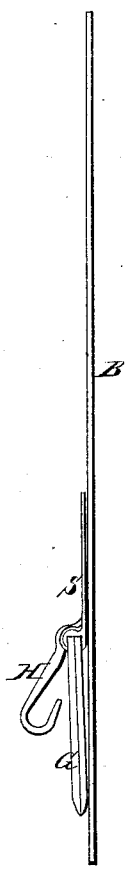
Fig: 3.
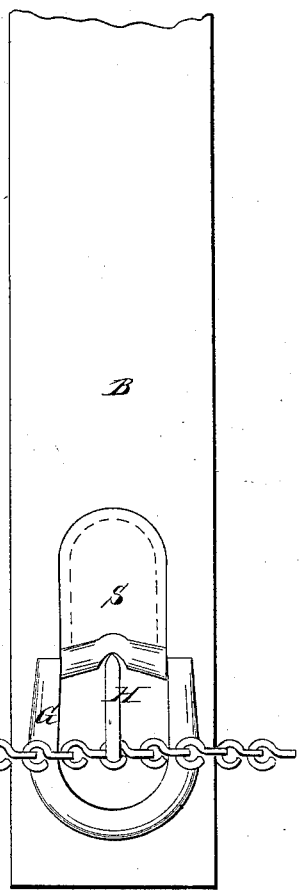

UNITED STATES PATENT OFFICE.

NOAH WARLICK, OF CHAMBERS COUNTY, ALABAMA.

BACK-BAND HOOK FOR PLOW-HARNESS.

Specification of Letters Patent No. 15,993, dated October 28, 1856.

*To all whom it may concern:*

Be it known that I, NOAH WARLICK, of Chambers county, Alabama, have invented a new and useful Improvement in Back-Band Hooks for Plow-Harness; and I do hereby declare that the following is a full, clear, and exact description of the construction and operation of the same, reference being had to the annexed drawing, forming part of this specification, in which—

Figure 1 is a face view of a back band with my improved hook attached. Fig. 2 is an edge view of the same. Fig. 3 is a view similar to that of Fig. 1, showing chain in position.

Similar characters of reference in the several figures denote the same part.

This invention consists in an improved construction of the hooks upon the back-bands of plow harness, for supporting the trace chains. The ordinary construction consists of a hook turning outward and resting upon the back-band, the defects of which are liability of the hook to catch objects with which it comes in contact, and the rubbing of the horse by the chain. Moreover there is a constant slipping of the chain from the hook. These defects I obviate by constructing the hook so as to turn toward the band, and surrounding by a guard turning upon its attachment to the band, the construction and operation being as hereinafter set forth.

In the drawing B is the band which passes over the back of the animal, on each end of which is hook for supporting the trace chains.

H is the hook and G the guard inclosing it, both capable of turning in the strap $s$ attaching them to the band. The hook turns inward as shown in Fig. 2, and is passed through one of the links of the chain C, which runs over the outer face of the guard G. The action of this combination is that the guard prevents the chain from rubbing the sides of the animal, and the rise and fall of the chain cannot release it from the hook. The hook is also prevented from catching bushes and other objects coming in contact with it, all of which renders it an improvement valuable to farmers.

I claim—

The reverse hook H in combination with the guard G inclosing the same, constructed, arranged, and operating as and for the purposes specified.

In testimony whereof, I have hereunto signed my name before two subscribing witnesses.

NOAH WARLICK.

Witnesses:
WM. F. WILLIS,
ESAW L. MCCLAIN.